(12) United States Patent
Karppanen (10) Patent No.: US 9,811,321 B1
(45) Date of Patent: Nov. 7, 2017

(54) SCRIPT COMPILATION

(71) Applicant: Amazon Technologies, Inc., Seattle, WA (US)

(72) Inventor: Jari Juhani Karppanen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 227 days.

(21) Appl. No.: 14/861,705

(22) Filed: Sep. 22, 2015

(51) Int. Cl.
*G06F 9/45* (2006.01)
*H04L 29/08* (2006.01)
*G06F 17/30* (2006.01)

(52) U.S. Cl.
CPC .......... *G06F 8/41* (2013.01); *G06F 17/30097* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 7,512,932 B2 * | 3/2009 | Davidov | G06F 8/30 715/234 |
| 2010/0313189 A1 * | 12/2010 | Beretta | G06F 9/45516 717/148 |

* cited by examiner

*Primary Examiner* — Chuck Kendall
(74) *Attorney, Agent, or Firm* — Knobbe, Martens, Olson & Bear, LLP (57) ABSTRACT

Systems and methods are described for utilizing script chunks in client-side browsing applications. A script chunking service divides scripts into smaller portions, and generates precompiled chunks of code that correspond to the portions. The service may then request compilation of only those portions of a script that do not have a corresponding precompiled chunk. Portions may be determined based on length, script keywords, or other criteria, and chunks may be identified by applying a hashing function to the portions. Scripts may be filtered to identify differing portions of source code that compile to functionally identical instructions, and the chunking service may use supplemental hashes, hashes of hashes, and compiler state information to facilitate identification and compilation of precompiled chunks.

25 Claims, 8 Drawing Sheets

```
function createCache() {
    var keys = [];

function cache( key, value ) {
        if ( keys.push( key + " " ) >
Expr.cacheLength ) {
            delete cache[ keys.shift() ];
        }
        return (cache[ key + " " ] = value);
    }
    return cache;
} function markFunction( fn ) {
    fn[ expando ] = true;
    return fn;
}

// Send error message
function assert( fn ) {
    var div = document.createElement("div");

try {
        return !!fn( div );
    } catch (e) {
        return false;
    } finally {
        if ( div.parentNode ) {
            div.parentNode.removeChild( div );
        }
        div = null;
    }
}
```

*300*

```
function createCache() {
    var keys = [];

function cache( key, value ) {
        if ( keys.push( key + " " ) >
Expr.cacheLength ) {
            delete cache[ keys.shift() ];
        }
        return (cache[ key + " " ] = value);
    }
    return cache;
```

*302a*

```
function markFunction( fn ) {
    fn[ expando ] = true;
    return fn;
}
```

*302b*

```
// Send error message
function assert( fn ) {
    var div = document.createElement("div");

try {
        return !!fn( div );
    } catch (e) {
        return false;
    } finally {
        if ( div.parentNode ) {
            div.parentNode.removeChild( div );
        }
        div = null;
    }
}
```

```
function createCache() {
    var keys = [];

function cache( key, value ) {
        if ( keys.push( key + " " ) >
            Expr.cacheLength ) {
            delete cache[ keys.shift() ];
        }
        return (cache[ key + " " ] = value);
    }
    return cache;
} function markFunction( fn ) {
    fn[ expando ] = true;
    return fn;
}

// Send error message
function assert( fn ) {
    var div = document.createElement("div");
    try {
        return !!fn( div );
    } catch (e) {
        return false;
    } finally {
        if ( div.parentNode ) {
            div.parentNode.removeChild( div );
        }
        div = null;
    }
}
```
300

```
function createCache() {
    var keys = [];
```
304a

```
function cache( key, value ) {
    if ( keys.push( key + " " ) >
        Expr.cacheLength ) {
        delete cache[ keys.shift() ];
    }
    return (cache[ key + " " ] = value);
}
return cache;
}
```
304b

```
function markFunction( fn ) {
    fn[ expando ] = true;
    return fn;
}
```
304c

```
function assert( fn ) {
    var div = document.createElement("div");
    try {
        return !!fn( div );
    } catch (e) {
        return false;
    } finally {
        if ( div.parentNode ) {
            div.parentNode.removeChild( div );
        }
        div = null;
    }
}
```
304d

SCRIPT COMPILATION

BACKGROUND

Generally described, computing devices and communication networks can be utilized to exchange information. In a common application, a computing device can request content from another computing device via the communication network. For example, a user at a personal computing device can utilize a software application process, typically referred to as a browser, to request a Web page from a server computing device via the Internet. In such embodiments, the user computing device can be referred to as a client computing device, and the server computing device can be referred to as a content provider.

With reference to an illustrative example, a requested Web page, or network resources, may be associated with a number of resources that are processed by a client computing device, such as images, text, graphics, script files and the like. Script files are typically encoded as source code in a computing language, such as JavaScript, that may be compiled by a browser or other software process into computer-executable instructions. These computer-executable instructions, when executed by the client computing device, may generate or cause changes to the content displayed with the Web page. Script files may be embedded in a Web page, or may be contained in a separate file and identified by a number of embedded resource identifiers, such as uniform resource locators ("URLs").

Once the client computing device obtains the Web page and associated script files, the content may be processed in a number of stages by the software browser application or other client computing device interface. For example, and with reference to the above illustration, the browser may parse the Web page to process various Hypertext Markup Language ("HTML") layout information and references to associated resources, may identify and process Cascading Style Sheets ("CSS") information, may process and instantiate various JavaScript code associated with the Web page, may construct a native object model to represent one or more components of the Web page, and may calculate various layout and display properties of the processed content for presentation to a user.

From the perspective of a user utilizing a client computing device, a user experience can be defined in terms of the performance and latencies associated with obtaining a Web page, processing embedded resource identifiers, compiling and executing script files, and rendering content on the client computing device. Latencies and performance limitations of any of the above processes may diminish the user experience. Additionally, latencies and inefficiencies may be especially apparent on computing devices such as netbooks, tablets, smartphones, and the like, which may have limited resources in terms of processing power, memory, or network connectivity.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure are directed to the execution of compilable source code by a software application process executing on a client computing device. More specifically, aspects of the present disclosure correspond to systems, methods, and computer-readable media related to utilizing a chunking service to compile executable code associated with a network resource. In an embodiment, a script chunking service divides a script into portions, matches portions to chunks of source code that have previously been compiled, and reuses these precompiled chunks when compiling the script for execution by the software application process. Although aspects of the embodiments described in the present disclosure will focus, for purposes of illustration, on the execution of scripts by a web browser, one skilled in the art will appreciate that the techniques disclosed herein may be applied to any number of software processes or applications. For example, a chunking service may be used when parsing a CSS file, processing browser plugin content, or in other situations where previous work by the client computing device may be reused. Although various aspects of the disclosure will be described with regard to illustrative examples and embodiments, one skilled in the art will appreciate that the disclosed embodiments and examples should not be construed as limiting.

With reference to an illustrative example, a user may cause a client computing device to load and execute a software browser application (henceforth referred to as a "browser") for accessing content provided by one or more content providers. Illustratively, the accessed content may include a collection of one or more network resources (e.g., a Web page) and embedded resources such as images, video, audio, text, executable code, and compilable scripts. Scripts may illustratively be written in JavaScript, ECMAScript, Jscript, ActionScript, Dart, VBScript, or other scripting languages. In some embodiments, the browser may include a compiler for compiling scripts into native code to enable faster execution on the client computing device.

Subsequent to the browser being loaded, a user or automated browser process may cause the client computing device to transmit a request to access content from a content provider by establishing a browse session with a content provider across a private or public network. The browse session request may include information identifying one or more sources for the requested content. The identifiers can be in the form of network addresses of network resources, such as a Web site or other network accessible piece of content. For example, the user may select or enter a URL (e.g., http://www.example.com) into a browser window, causing the client computing device to transmit a request for a new browse session to the content provider, including the selected URL.

In an illustrative embodiment, the browser may receive content from the content provider in response to the request. The browser may comprise, for example, a layout engine or rendering engine that parses the received content to identify and process various elements, such as HTML layout information, CSS information, embedded objects such as images or video, or script content such as JavaScript or other source code. In some embodiments, the rendering engine or the browser may request compilation of embedded source code by transmitting the source code to a script chunking service. The script chunking service may illustratively be implemented as a component of the browser, as a separate software process, as a component of a compiler (which may itself be implemented as a browser component or separate software process), or by other combinations of hardware and software.

The script chunking service may divide the source code (henceforth referred to generally as a "script") into portions. Illustratively, the script chunking service may divide a script into portions by determining a number of bytes, characters, or lines of source code to include in each portion, generally referred to as "chunks." In some embodiments, the portions may be of a fixed, equal size. Alternatively, in some embodiments, the service may divide the script into portions of variable size. For example, as described below, the script chunking service may utilize contextual cues, such as identifying keywords to use as boundaries between one portion. In other embodiments, the script chunking service may otherwise parse the script to identify portions likely to have been previously compiled.

The script chunking service may illustratively filter the script before or after dividing it into portions. For example, the service may apply a filter to remove whitespace characters (e.g., spaces, tabs, line feeds, and so forth) from the script, or to normalize the script (e.g., by replacing variable or function names with generic counterparts). Illustratively, removing whitespace and normalizing the script may enable identification of scripts or portions of scripts that differ in content but compile to the same computer-executable instructions. Filters may include character strings, regular expressions, executable code, or other criteria. One skilled in the art will further appreciate that the script chunking service may pre-process the source code in other ways to facilitate identification of precompiled chunks. For example, the script chunking service may utilize a compressor or minifier before dividing the script into portions.

In accordance with the illustrated embodiment, the script chunking service may generate one or more hashes for each portion of the script. The script chunking service may generate a primary hash corresponding to the utilization of a hashing function on all or part of the source code in the portion. The primary hash will be used as a determination of whether pre-compiled script chunks do or do not match. In some embodiments, one or more supplemental hashes, or hash hints, may be used as a way of identifying potential target matches. The supplemental hashes typically require less processing resources and can be implemented quickly or used to limit the number of potentially matching primary hashes that are compared. The script chunking service may generate a supplemental hash based on a smaller segment of the portion, or may generate several hash hints for one portion by, for example, using a rolling hash function. The script chunking service may further generate hashes for multiple portions or combinations of portions. For example, after dividing a script into portions A, B, and C, the service may generate individual hashes corresponding to portion A, portion B, portion C, portions A and B, portions A and C, and portions B and C. The script chunking service may generate hashes based on the portions, based on previously generated hashes, or both.

The script chunking service may illustratively store precompiled chunks of source code along with hashes identifying the precompiled chunks. In an embodiment, the script chunking service may request a set of chunk hashes from a data store, and may receive and compare the chunk hashes to the portion hashes it generates to identify whether the data store contains precompiled chunks corresponding to any of the script portions. For example, the service may generate hashes 1, 2, and 3 for portions A, B, and C respectively. The service may then retrieve hashes 2, 4, and 5 from the data store, and may compare the sets of hashes to determine that a precompiled chunk in the data store corresponds to portion B of the script. The script chunking service may further request supplemental chunk hashes from the data store, which may narrow the list of potentially corresponding precompiled chunks to consider.

Having identified that a precompiled chunk corresponds to one of the portions, the script chunking service may illustratively request the precompiled chunk from the data store. The precompiled chunk may include additional information, such as compiler state information, to enable compiling and merging other source code with the precompiled chunk.

In an illustrated embodiment, the script chunking service may request compilation of any remaining portions of the script that do not have a corresponding chunk, such as portions A and C in the above example. The script chunking service may illustratively pass these portions to a compiler, and in some embodiments may also pass the precompiled chunks and associated compiler state information. The compiler may then compile the remaining portions, and may assemble the compiled portions and the precompiled chunks into a complete version of the compiled script. By using the precompiled chunks, the compiler may reduce the time and resources required to fully compile the script. In some embodiments, the compiler may capture state information regarding the compiler state after compiling remaining portions, and may pass the compiled portions and the corresponding compiler state information back to the script chunking service for storage in the data store. The script chunking service may further store the hashes it generates for a portion along with the compiled portion and the compiler state information.

Figure 1:
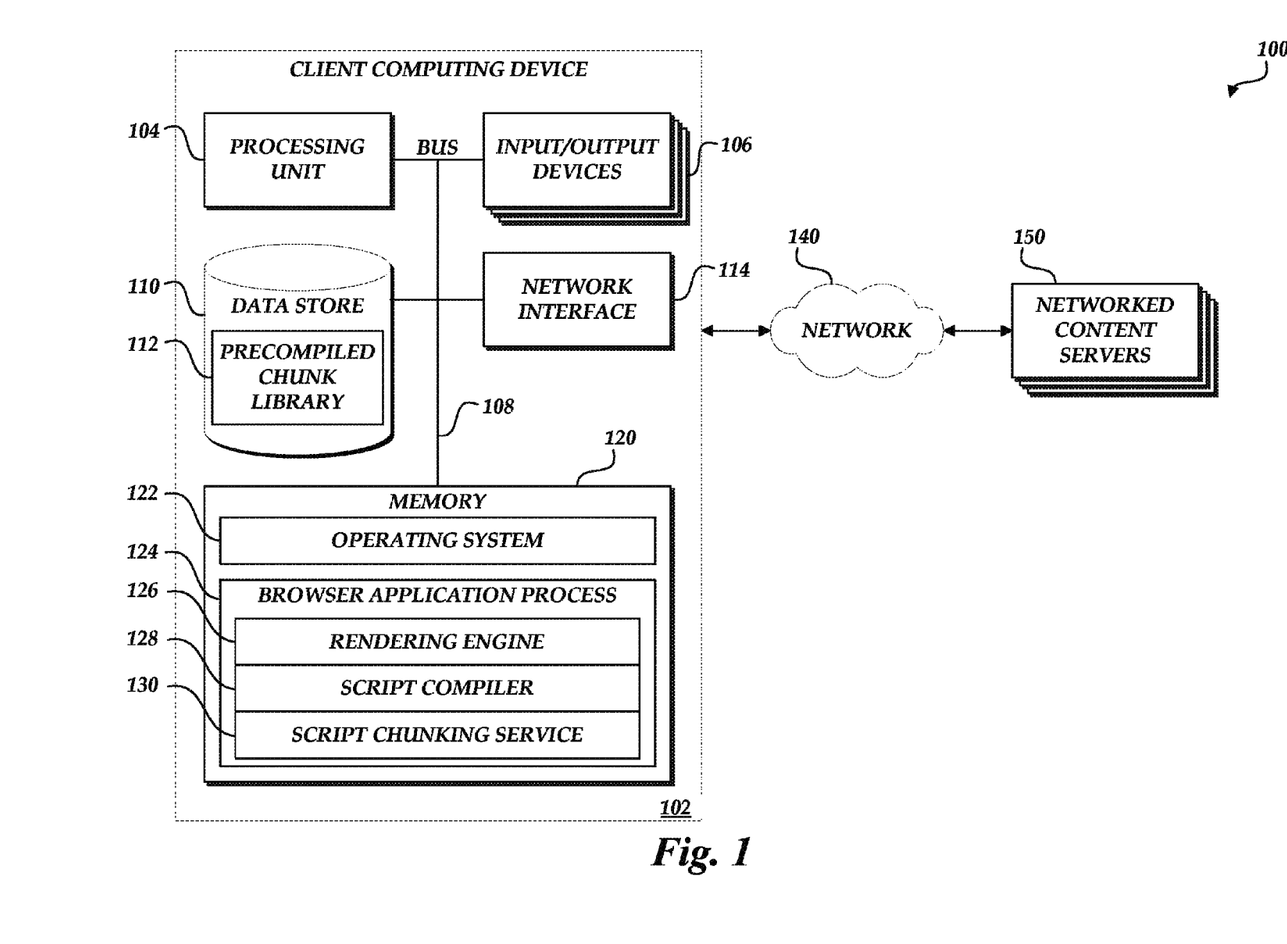
FIG. 1 is a schematic block diagram of an illustrative network topology including a browser application process executing on a client computing device, a script chunking service implemented by the browser application process, networked content servers, and a network interconnecting the client computing device and the networked content servers.

FIG. 1 is a block diagram illustrative of a networked computing environment 100 for the managing and processing of content requests in accordance with the present disclosure. As illustrated in FIG. 1, the networked computing environment 100 includes a client computing device 102 ("client") for requesting content from networked content servers 150 via a communications network 140. In an illustrative embodiment, the client 102 can correspond to a wide variety of computing devices including personal computing devices, laptop computing devices, hand-held computing devices, terminal computing devices, mobile devices (e.g., mobile phones, tablet computing devices, etc.), wireless devices, various electronic devices and appliances, and the like.

In an illustrative embodiment, the client 102 includes necessary hardware and software components for establishing communications over the communications network 140.

For example, the client 102 may be equipped with a network interface 114 and browser application process 124 that facilitate communications via the network 140. The network 140 can be a publicly accessible network of linked networks, possibly operated by various distinct parties, such as the Internet. In other embodiments, the network 140 may include a private network, local area network ("LAN"), wide area network ("WAN"), cable network, satellite network, wireless telecommunications network, any other medium of computer data transfer, or some combination thereof.

The client 102 may also have varied local computing resources such as central processing units 104, input/output devices 106, a bus interface 108, data stores 110, memory 120, etc. One skilled in the art will appreciate that the client 102 may have more or fewer components than those depicted in illustrative FIG. 1. In an illustrative embodiment, the data store 110 may store a precompiled chunk library 112 and associated hashes (not depicted in FIG. 1) to facilitate identification and reuse of previously compiled source code. The memory 120 may illustratively contain, inter alia, an operating system 122 and the browser application process 124. The browser application process 124 may in turn include components such as a rendering engine 126, a script compiler 128, and a script chunking service 130, as described in more detail below. In some embodiments, the script chunking service 130 may be a component of the script compiler 128, or in other embodiments may be a stand-alone component. The networked computing environment 100 also includes one or more networked content servers 150 in communication with the client 102 via the communication network 140. The networked content servers 150 may illustratively be web servers configured to respond to requests from the browser application process 124 executing on the client 102.

The modules or components illustrated in FIG. 1 may include additional components, systems, and subsystems for facilitating the methods and processes. For example, in various embodiments, the client 102 may be centralized in one computing device, distributed across several computing devices, implemented by one or more virtual machine instances, and/or distributed through a network.

Figure 2A:
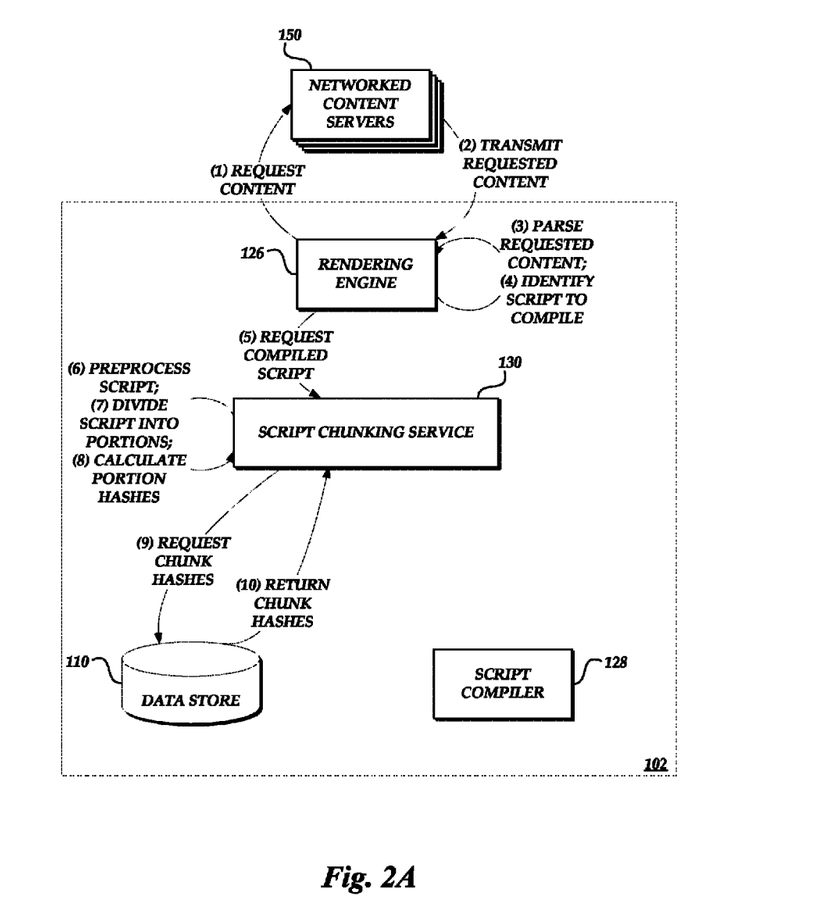
FIGS. 2A and 2B are illustrative block diagrams depicting detection and compilation of a script of which portions have previously been compiled, as performed a browser application process implementing the script chunking service of FIG. 1.
Figure 2B:
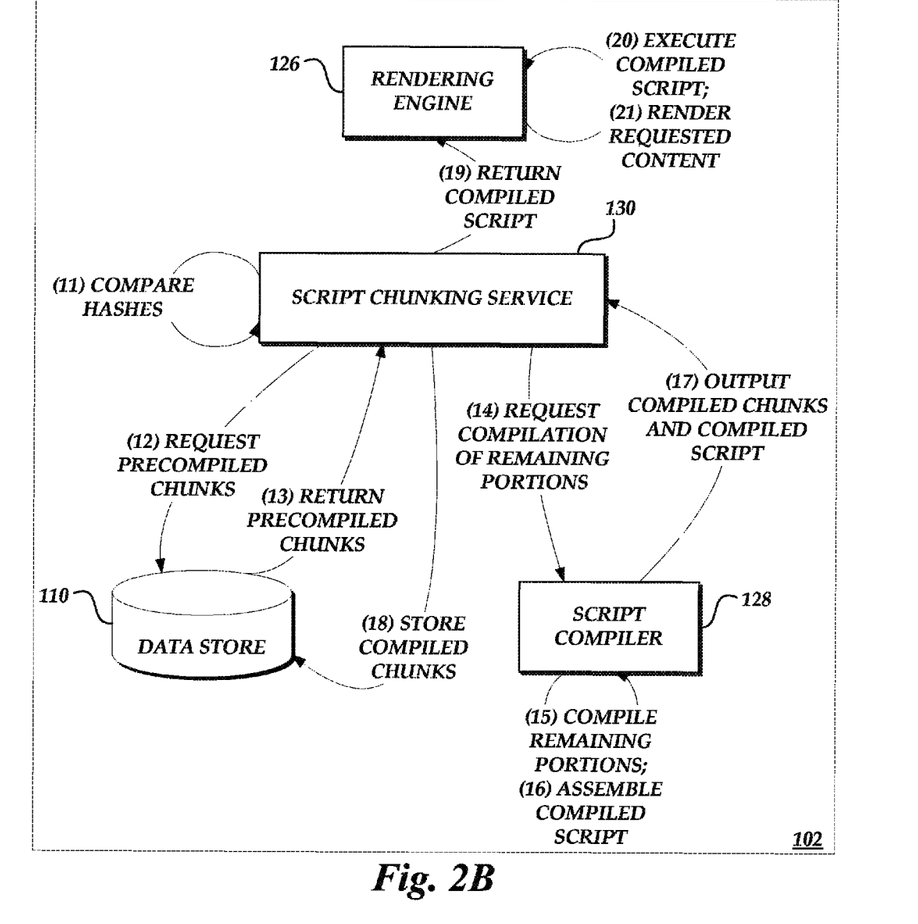

With reference now to FIGS. 2A and 2B, the interaction between various components of the networked computing environment 100 of FIG. 1 will be illustrated. Specifically, FIGS. 2A and 2B illustrate the interaction between various components of the networked computing environment 100 for the exchange of content between a client 102 and networked content servers 150 via the network 140. For purposes of example, however, the illustration has been simplified such that many of the components used to facilitate communications are not shown. One skilled in the relevant art will appreciate that such components can be utilized and that additional interactions would accordingly occur without departing from the spirit and scope of the present disclosure.

FIG. 2A is a block diagram of the networked computing environment 100 of FIG. 1 illustrating the identification of a compilable script and the identification of precompiled chunks corresponding to portions of the script. As illustrated in FIG. 2A, at (1), a component of the browser 124, such as the rendering engine 126, transmits a content request to one or more network content servers 150. The content request may illustratively include a query for a resource's URL, and may establish a browse session with a networked content provider. At (2), the networked content servers 150 may respond to the content request by transmitting content in accordance with common network protocols, such as the Hypertext Transfer Protocol ("HTTP"). The transmitted content may include various network resources, such as HTML documents, CSS information, images, videos, embedded scripts, and the like.

At (3), the rendering engine 126 may parse the received content. Illustratively, the rendering engine 126 may parse HTML and CSS documents to identify content and determine layout of other elements. Thereafter, at (4), the rendering engine 126 may identify that the received content includes a compilable script. Illustratively, the script may be identified by an HTML tag or other identifier that is recognized by the rendering engine 126. The script may be embedded within a document, such as an HTML file, or may be received separately as a stand-alone document. In some embodiments, the script may contain source code in a scripting language such as JavaScript, Dart, or the like.

At (5), the rendering engine 126 may request compilation of the identified script. In the illustrated embodiment, the rendering engine 126 requests compilation by passing the script to the script chunking service 130. In other embodiments (not depicted in FIG. 2A), the rendering engine 126 passes the script to the script compiler 128, which interacts with the script chunking service 130 to identify and retrieve precompiled chunks of the script as described below.

Thereafter, at (6), the script chunking service 130 may apply filters to preprocess the script. The service 130 may filter the script to remove, for example, comments or whitespace from the script. Comments may be identified and removed by a pattern matching algorithm (e.g., a regular expression parser) that matches, for example, character sequences starting with "/*" and ending with "*/". Further, in some embodiments, the script chunking service 130 may filter the script to normalize the script content. For example, the service 130 may filter source code containing the function name "changeColor( )" to instead use the function name "c( )", and may filter a different source code file containing the function name "changeColour( )" to instead use the function name "c( )". By doing so, the script chunking service 130 may detect portions of scripts that differ only in variable and function names, and that produce the same computer-executable instructions when compiled. One skilled in the art will appreciate that the interaction at (6) may be carried out before or after the interaction at (7).

At (7), the script chunking service 130 divides the script into portions. Illustratively, the script chunking service 130 may divide the script into portions based on a minimum portion size, such as a fixed number of bytes, characters, or lines of source code. The minimum portion size may be chosen, for example, by analyzing performance metrics, comparing compiler speed to chunk retrieval speed, and determining a threshold below which it may be more efficient to compile source code than to retrieve a chunk. In some embodiments, the script chunking service 130 may divide the script into portions of various sizes based on script contents. For example, the script chunking service 130 may identify a particular keyword or a series of characters, such as "function" or a line consisting entirely of a closing brace ("}"), as a potential boundary for starting a new portion. The script chunking service 130 may combine these criteria to generate, e.g., portions that begin with the word "function" and are at least a threshold number of characters in size. In further embodiments, the script chunking service 130 may employ other techniques or algorithms to determine portion sizes and divide the script into portions.

With continued reference to FIG. 2A, at (8), the script chunking service 130 calculates hashes for the portions. As described above, the script chunking service 130 may use a hash function to calculate a hash based on the portion, to calculate supplemental hashes based on subsets of the portion (e.g., by using a rolling hash function), and may further calculate hashes of previously generated hashes. For example, the service 130 may calculate hashes that correspond to multiple portions of the script.

At (9), the script chunking service 130 may request chunk hashes. Illustratively, chunk hashes may be stored in and requested from a library, such as the precompiled chunk library 112 stored on the data store 110 of FIG. 1. The script chunking service may request all available chunk hashes, chunk hashes that match a particular hash or hashes, or may apply other criteria to reduce the number of chunk hashes to consider. One skilled in the art will appreciate that the interaction at (9) may occur before or during any of interactions at (1)-(8), and may only depend on the interaction at (8) to the extent that supplemental hashes are used to reduce the number of hashes requested. For example, in some embodiments, the script chunking service 130 may maintain a list of chunk hashes and may only store the precompiled chunks themselves in a data store 110. In other embodiments, the functionality of the data store 110 and the script chunking service 130 may be combined, and all or some of the interactions (5) through (10) may involve or be carried out by the script compiler 128.

In the illustrated embodiment, each chunk hash corresponds to one or more precompiled chunks of source code that are stored in the data store 110. Chunk hashes may correspond to an individual chunk, or may be supplemental hashes that are used to narrow the search for a matching chunk to a particular subset of the chunks in the data store 110. At (10), the data store responds to the request from the script chunking service 130 by returning a set of chunk hashes. As discussed above, the set of chunk hashes returned by the data store 110 may be a subset of the available chunk hashes, or may include hashes for all chunks in the data store 110.

With reference now to FIG. 2B, the script chunking service 130 at (11) compares the portion hashes it generated for the script portions to the chunk hashes it retrieved from the data store 110. As an illustrative example, the service 130 may generate portion hashes "ABC," "DEF," and "GHI" for three portions of a particular script. The service 130 may then query the data store 110 for chunk hashes, and may receive chunk hashes "ABC," "GHI," "JKL," and "MNO." The script chunking service 130 may compare these hashes and determine that the first and third script portions have previously been compiled, and that chunks corresponding to these portions are stored in the data store 110.

At (12), the script chunking service 130 requests the precompiled chunks that match portions of the script, and at (13) the data store 110 returns these precompiled chunks. One skilled in the art will appreciate that the interactions at (8) through (13) may be combined and carried out in various ways within the scope of the present disclosure. For example, the script chunking service 130 may generate a portion hash "ABC" for a script portion, request that the data store send any chunk matching the hash "ABC," and receive a precompiled chunk corresponding to that hash, without ever requesting or receiving a list of hashes from the data store 110. As a further example, the script chunking service 130 may generate a supplemental hash "A" for a script portion, may request and receive hashes "AAA" and "ABC" in response to a request for hashes matching the supplemental hash, and may then determine that chunk "ABC" represents a previous compilation of the script portion.

At (14), the script chunking service 130 may pass the precompiled chunks it has identified to the script compiler 128, along with the portions of the script that did not have a matching precompiled chunk, and request that the script compiler 128 compile and merge the precompiled chunks and the portions with no matching chunk into a compiled script. In some embodiments, the script chunking service 130 may retrieve compiler state information along with the precompiled chunk, enabling the compiler 128 to restore the appropriate state before or after compilation of a particular chunk and allowing the compiler 128 to seamlessly combine the un-compiled portions and precompiled chunks. As described above, in some embodiments, the script compiler 128 may instead receive a compilation request from the rendering engine 126 (or from any other component) and may request precompiled chunks from the script chunking service 130 rather than the service 130 requesting compilation.

At (15), the script compiler 128 compiles the script portions for which no matching chunk was identified, and may optionally store its state information before and after compiling each script portion. At (16), having obtained a complete set of compiled chunks of between its own compilation and the chunks stored in the data store 110, the compiler 128 assembles the chunks into a full copy of the compiled script.

Thereafter, at (17), the script compiler 128 outputs the compiled script to the script chunking service 130. As described above, in some embodiments, the compiler 128 may output the compiled script directly to the rendering engine 126. The compiler 128 may also optionally output the chunks it compiled to the script chunking service 130, which in turn at (18) may store these chunks, along with any hashes it generated for the corresponding portion, in the data store 110. At (19) the script chunking service returns the compiled script to the rendering engine, which at (20) may execute the compiled script and at (21) may render the requested content including any output or modifications generated by the compiled script. The compiler may further output state information for storage with the chunks and hashes, enabling future identification and re-use of script chunks that were compiled during these interactions. Additionally, one skilled in the art will understand that the interactions at (18) and (19) may be carried out in any order.

Figure 3A:
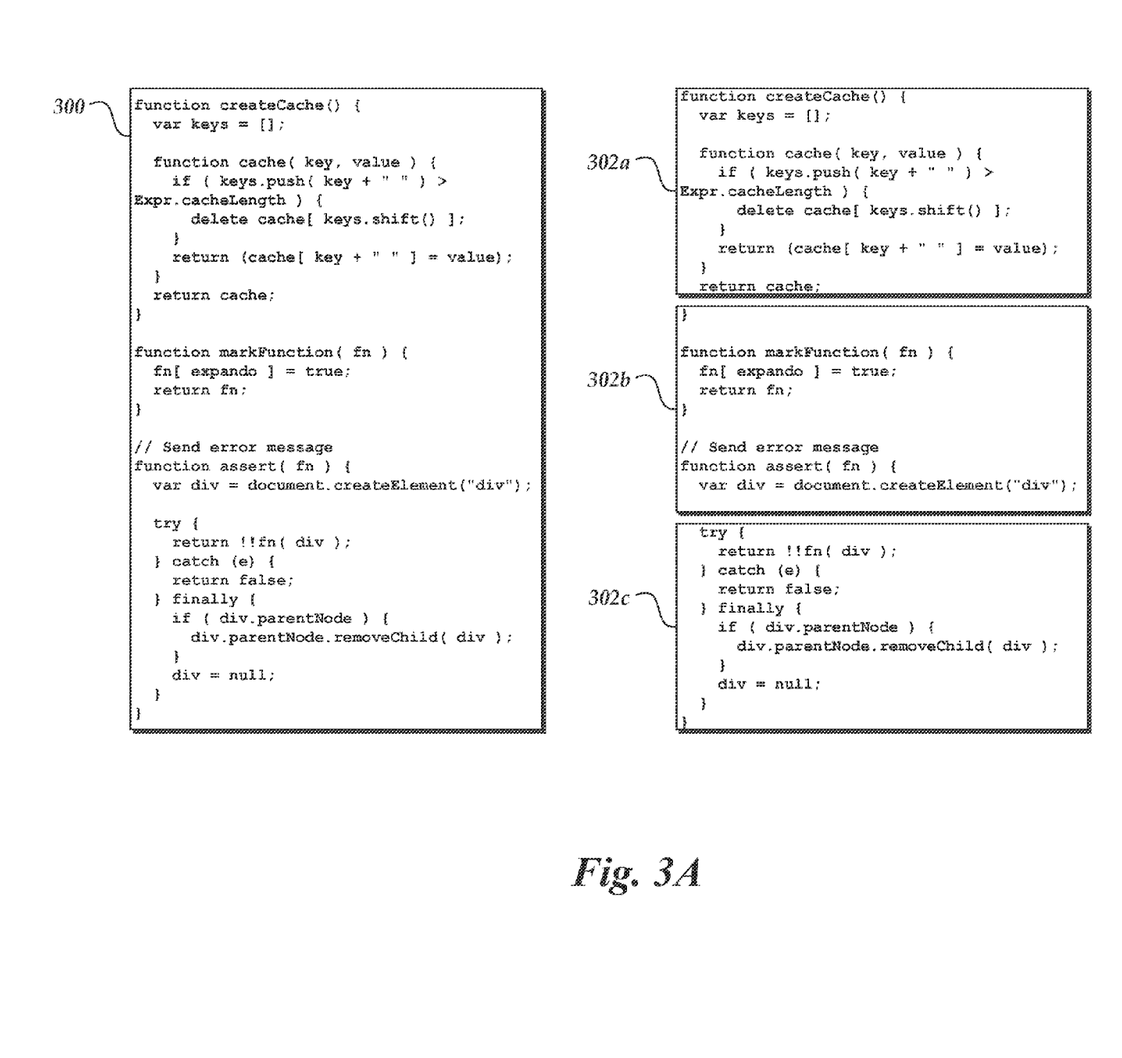
FIGS. 3A, 3B, and 3C are illustrative diagrams depicting division of a script into portions and identification of pre-compiled chunks in accordance with the present disclosure.
Figure 3B:
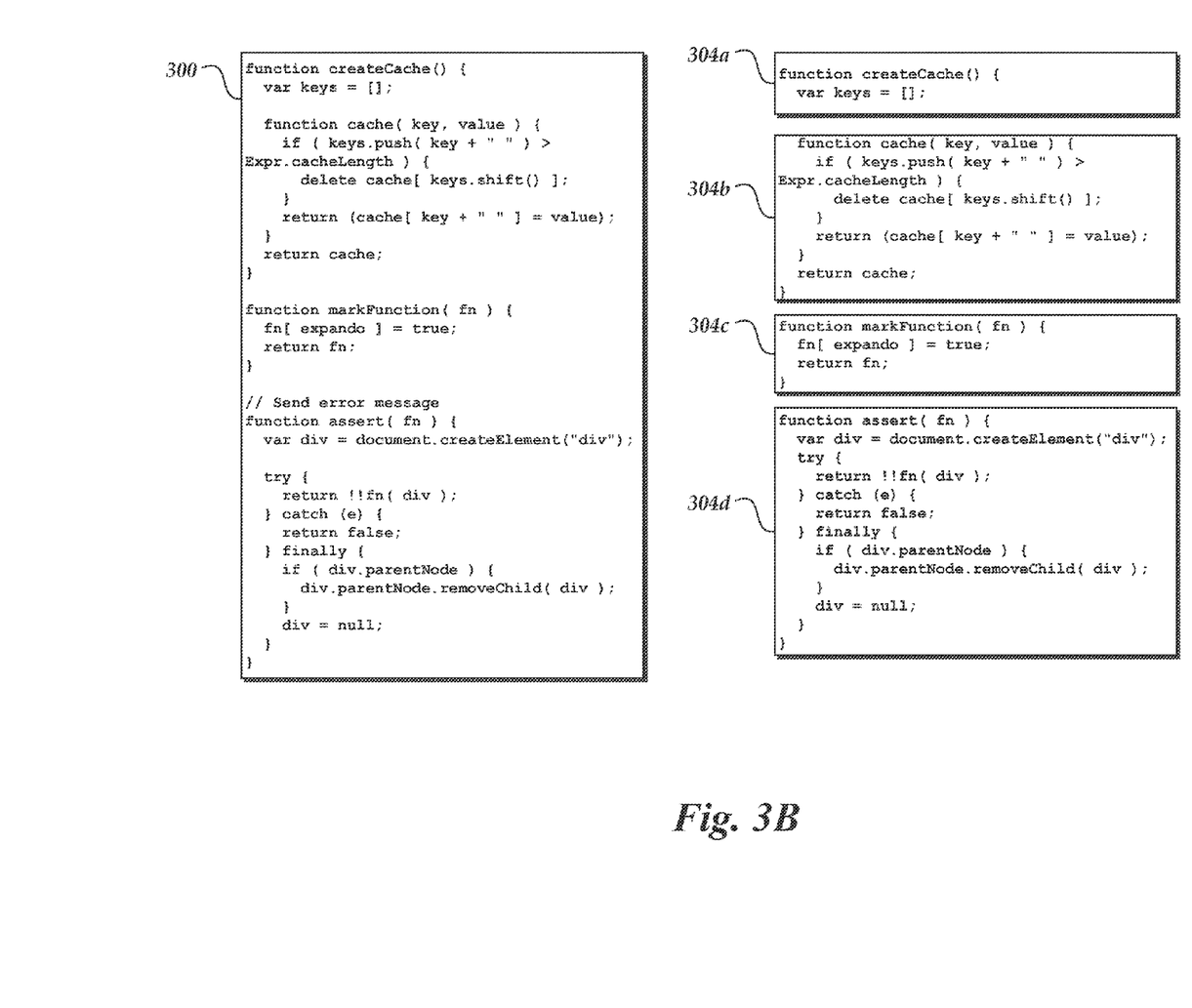

Turning now to FIGS. 3A and 3B, illustrative examples of dividing a script into portions will be described. Illustratively, scripts may be divided into portions by the script chunking service 130 of FIG. 1. Alternatively, in some embodiments, scripts may be divided into portions by a script compiler 128, a rendering engine 126, or another element or elements of the client computing device 102.

With reference to FIG. 3A, script 300 illustratively contains several lines of compilable source code, including functions, comments, and other information. Although FIG. 3A depicts JavaScript source code, one skilled in the art will appreciate that aspects of the present disclosure may apply to any scripting language, plugin, or other compilable content.

Portions 302a, 302b, and 302c represent a division of source code into portions based on a fixed number of lines in each portion. In the illustrated embodiment, portion 302a contains part of the source code of a JavaScript function, portion 302b contains one complete function and parts of two others, and portion 302c contains the remainder of a function. Further, portion 302a contains a function within a function (the "cache" function). In some embodiments, the script chunking service 130 may identify that part of a portion, such as the complete function in portion 302b, corresponds to a precompiled chunk. Illustratively, the service 130 may use a rolling hash function to calculate hash values for lines of code within the portion, and may identify a chunk that corresponds to a particular subset of the chunk. The service 130 may then associate the remaining parts of the portion with the preceding and succeeding portions, and may optionally recalculate hash values and seek further matches.

In some embodiments, the script chunking service 130 may calculate a hash value for portions 302b and 302c in combination, and may identify a single precompiled chunk that corresponds to multiple functions in the source code. In further embodiments, the service 130 may identify a chunk that corresponds to the whole of portion 302b, and that includes compiler state information about the preceding and succeeding chunks to allow compilation to continue from the portion's starting point and ending point. For example, the compiler state information at the end of portion 302b may indicate that a function had been declared and a variable had been created.

FIG. 3B depicts an alternative to FIG. 3A in which the script chunking service 130 divides the script 300 into portions based on keywords in the source code. In the illustrated embodiment, script 300 is divided into portions 304a, 304b, 304c, and 304d based on the location of the keyword "function" in the source code of script 300. Portion 304a contains part of the source code of a JavaScript function. Portion 304b contains the remainder of the function, including the function within a function (the "cache" function) that caused the script chunking service 130 to begin a new portion 304b. Portions 304c and 304d each contain a complete function. FIG. 3B further illustrates that, in some embodiments, the script chunking service may filter the script before dividing it into portions. For example, comments and blank lines that would have appeared in portions 304c and 304d have been filtered and removed.

In some embodiments, as described above, the script chunking service 130 may consider both keywords and minimum length requirements when dividing a script into portions. For example, in an alternative embodiment not depicted, the service 130 may determine that portion 304a should contain at least six lines of code, and thus may ignore the appearance of the keyword "function" in the third line of the script and instead divide the script in a manner that combines illustrative portions 304a and 304b. Additionally, in further embodiments, the service 130 may enforce a maximum portion size regardless of whether a keyword is found.

Figure 3C:
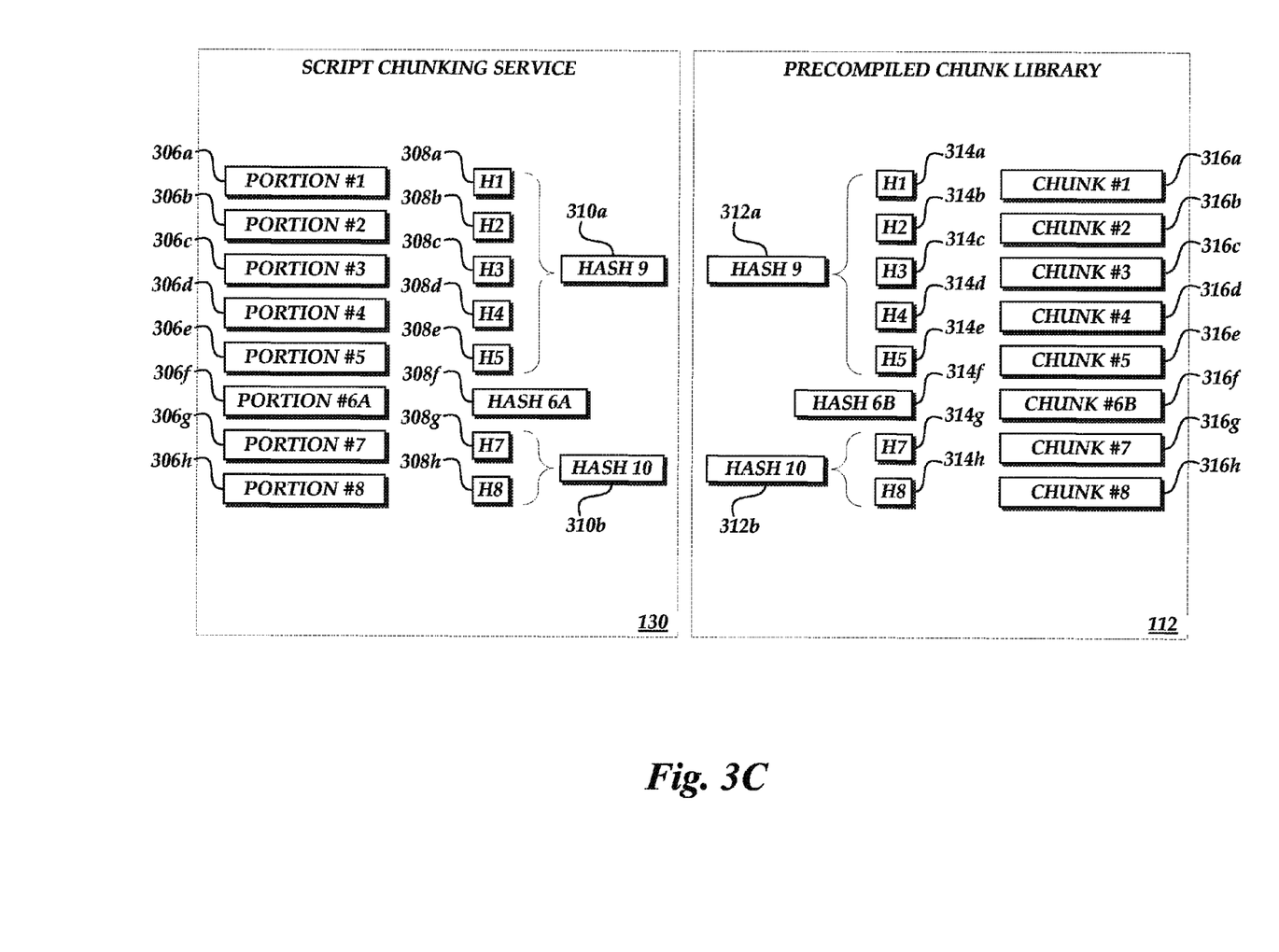

With reference now to FIG. 3C, an illustrative diagram depicting identification of precompiled chunks that match portions of a script will be described. Identification of matching precompiled chunks may be performed, for example, by the script chunking service 130.

In an illustrated embodiment, script chunking service 130 divides a compilable script into portions 306a-h, as described above with regard to FIGS. 3A and 3B. The service 130 further calculates hash values 308a-h. In some embodiments, the service 130 then calculates hashes for various combinations of portions based on the hashes calculated for each portion. For example, hash 310a may be calculated based on the five individual hashes 308a-e, and hash 310b may be calculated based on the hashes 308g-h. Hash 6A, as illustrated in FIG. 3C, corresponds to portion 306f alone.

Precompiled chunk library 112 may similarly contain precompiled chunks 316a-h and hash values 312a-b and 314a-h that are stored in conjunction with precompiled chunks. In the illustrated embodiment, hash 312a is a "hash of hashes" representing chunks 316a-f, and hash 312b is a hash representing chunks 316g-h. In some embodiments, these hashes are calculated during previous invocations of the script chunking service 130 and stored in the precompiled chunk library 112 for later use. One skilled in the art will appreciate that the script chunking service 130 may generate more or fewer hashes than are depicted in illustrative FIG. 3C, and that the precompiled chunk library 112 may store more or fewer hashes than are illustrated. The depiction in FIG. 3C is thus understood to be illustrative and not limiting.

With continued reference to FIG. 3C, the script chunking service 130 may determine that portion hash 310a corresponds to chunk hash 312a, and thus that precompiled chunks 316a-f should be retrieved and reused. Similarly, the service 130 may determine that portion hash 310b corresponds to chunk hash 312b, and thus that precompiled chunks 316g-h should be retrieved and reused. In some embodiments, chunks 316a-e may be retrieved as a single chunk. In other embodiments, chunks 316a-e may be retrieved individually. As further illustration, the script chunking service 130 may determine that portion hash 308f does not correspond to any of the hashes in the precompiled chunk library 112, and accordingly that compilation of portion 306f will be required in order to complete compilation of the script.

Figure 4:
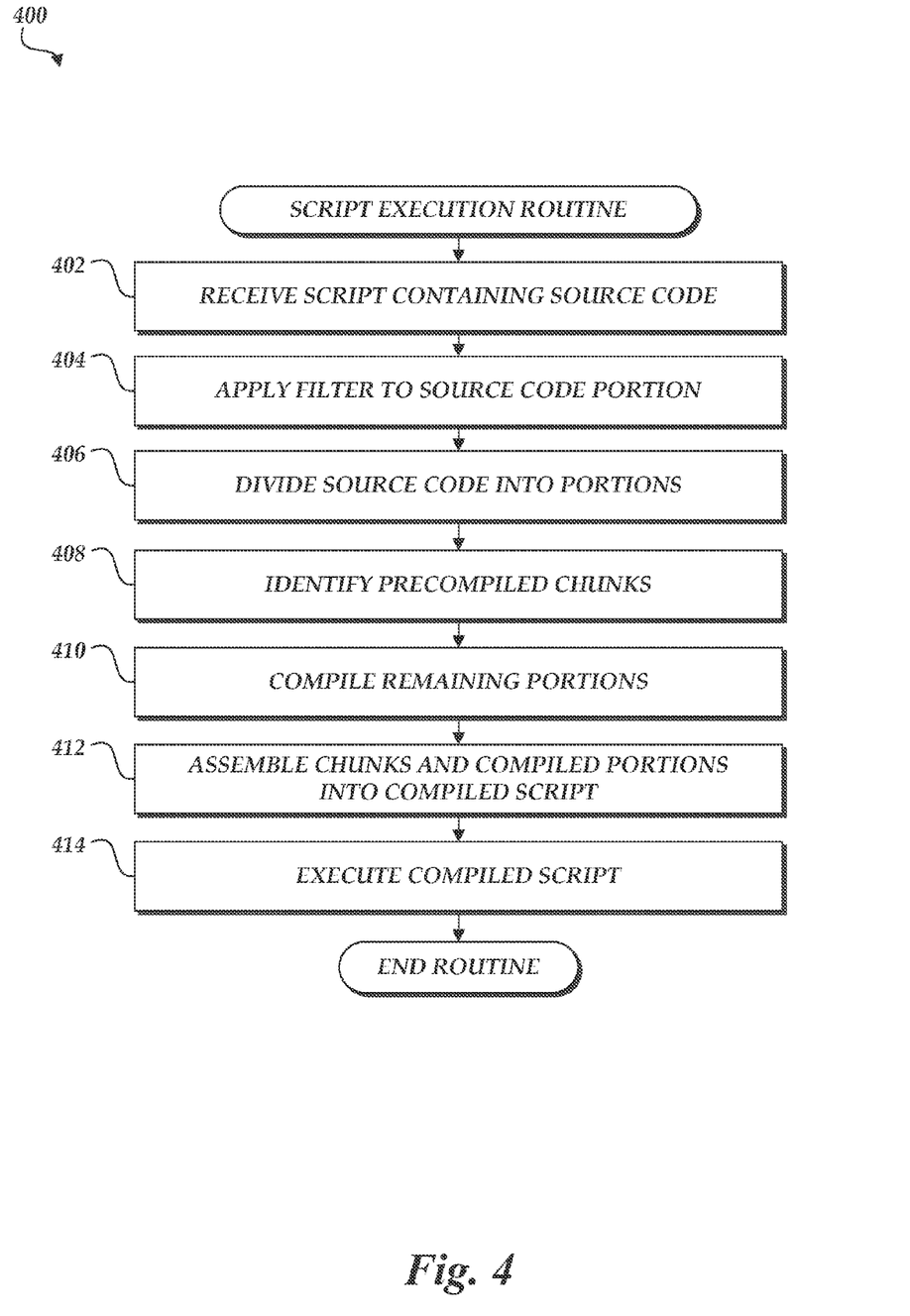
FIG. 4 is a flow diagram depicting an illustrative script execution routine implemented by browser application process that implements a script chunking service.

FIG. 4 is a flow diagram illustrative of a script execution routine 400 implemented in accordance with the present disclosure. The script execution routine 400 may be carried out, for example, by the browser application process 124 depicted in FIG. 1. In some embodiments, the routine 400 may be carried out by a component of the browser application process 124, such as the rendering engine 126.

At block 402, a script containing compilable source code may be received. As described above, the script may be embedded in an HTML document and detected by, e.g., the rendering engine 126 during parsing of the document. Alternatively, in some embodiments, the script may be received as a separate file along with other web content, or may be received in response to a direct request by, e.g., the browser application process 124.

At block 404, a filter or filters may optionally be applied to the source code. As described above, filters may be used to remove whitespace or comments, to normalize function or variable names, or in other ways that facilitate identifying a chunk of precompiled code that matches the filtered source code. One skilled in the art will understand that finding a match between a script portion and a precompiled chunk, in this context, means finding a precompiled chunk having the characteristic that all or part of the source code in the script portion could be compiled to produce computer-executable instructions substantially identical to those found in the precompiled chunk. Filters may thus be applied to remove source code elements that are not significant to a compiler and do not affect the results of compilation. One skilled in the art will further understand that source code portions may differ in terms of whitespace, comments, or other elements, but may nonetheless produce the same computer-executable instructions when compiled. Such portions may have a many-to-one correspondence with a particular precompiled chunk, and the application of filters may facilitate identification of the particular precompiled chunk.

At block 406, the source code may be divided into portions. As described above with regard to FIGS. 3A and 3B, source code may be divided into portions of a fixed size, such as a fixed number of characters or lines, or may be divided based on specific keywords or other characteristics of the source code. Further, although not depicted in FIG. 4, the source code may be filtered to, for example, remove comments and whitespace, or to normalize function and variable names. At block 408, precompiled chunks that correspond to the portions may be identified. In some embodiments, precompiled chunks may be identified by a script chunking service 130 that implements a chunk identification routine, such as the illustrative routine 500 of FIG. 5 as described below.

Thereafter, at block 410, those portions of the script that are not matched to a corresponding precompiled chunk may be compiled, and at block 412 the precompiled chunks and compiled portions may be assembled into a fully compiled version of the script. Compilation and assembly of the compiled chunks may illustratively be carried out by a compiler, such as the script compiler 128 of FIG. 1. In some embodiments, compiler state information may be supplied to the script compiler 128 to facilitate compiling chunks and assembling them into the complete compiled script, as described above. At block 414, the compiled script may be executed. Illustratively, the compiled script may be executed by the browser application process 124 of FIG. 1, or by a component of the browser application process 124 such as the rendering engine 126.

In certain embodiments, blocks 410 and 412 may be deferred or omitted. For example, a script may include a number of library functions that are not always used during script execution. The script execution routine 400 may thus take a "wait and see" approach regarding these script portions, and may determine during script execution whether compilation of these portions will be required. Further, in some embodiments, block 414 may be carried out in parallel with block 410, allowing execution of compiled script chunks to begin while the script compiler 128 compiles additional portions in the background. The script compiler 128 may illustratively utilize a pending compilation queue to facilitate deferred compilation of these portions. Still further, in some embodiments the script execution routine 400 may interpret certain portions of the script rather than compiling them, and may generate statistics on how often certain portions of the script are executed in order to determine the efficiency of compiling these portions or determine their priority in a compilation queue.

Figure 5:
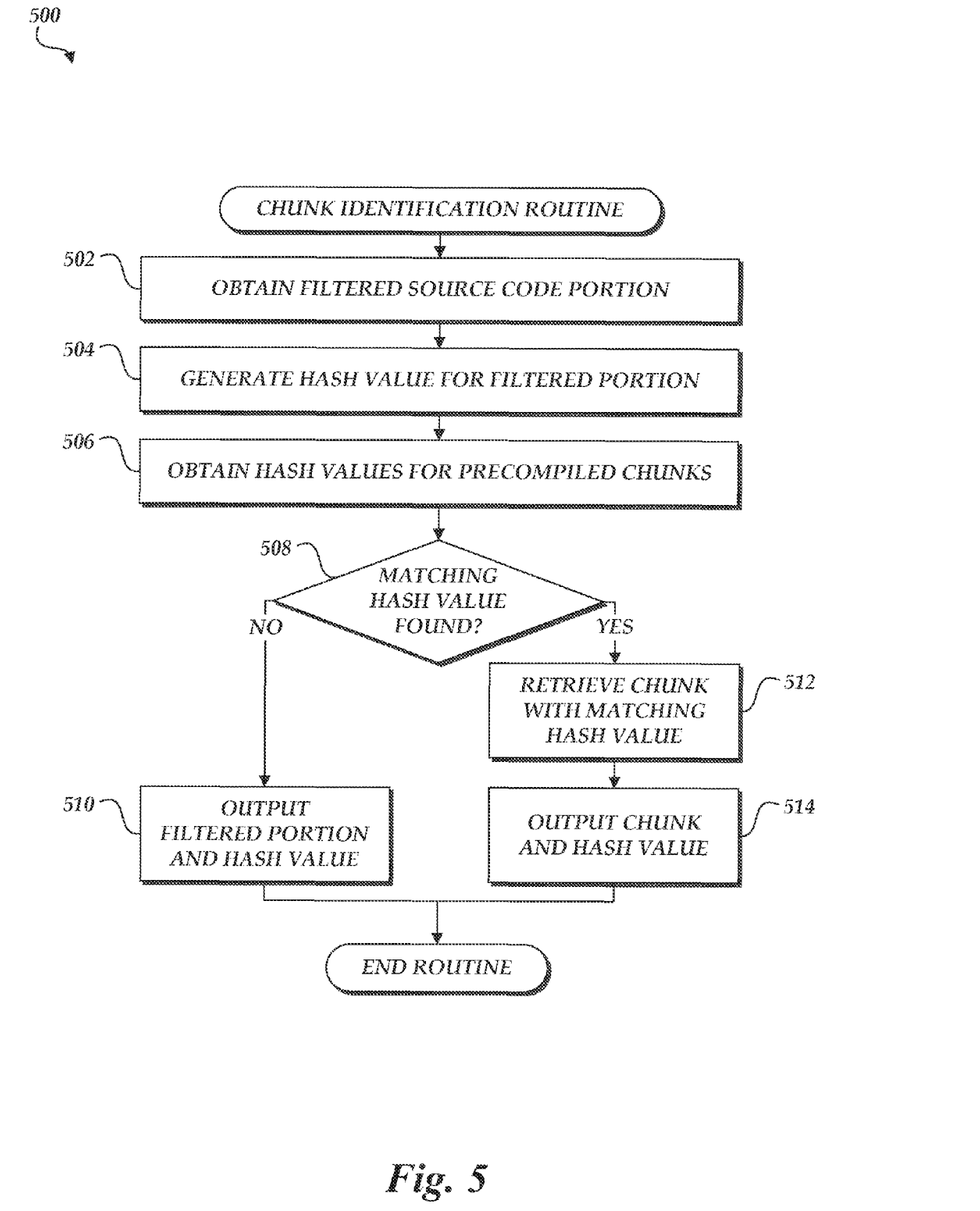
FIG. 5 is a flow diagram depicting an illustrative chunk identification routine implemented by a script chunking service.

With reference now to FIG. 5, an illustrative flow diagram of a chunk identification routine 500 will be described. The chunk identification routine 500 may be carried out, for example, by the script chunking service 130 of FIG. 1. At block 502, a portion of a script containing compilable source code may be obtained. Illustratively, the script portion may be obtained from a routine that filters and divides a script into portions, such as the script execution routine 400 depicted in FIG. 4.

At block 504, hash values for the filtered source code portion may be generated. Hashes may be generated using a hashing algorithm such as SHA-1, Rabin-Karp, or any other algorithm or function that produces a hash value. In some embodiments, multiple hashes may be generated. For example, hashes may be generated for the unfiltered portion, for a version of the portion with one or more filters applied, or for substrings within the portion. In further embodiments, a rolling hash function may be used to generate hash values for multiple substrings within the portion. These hashes may be used as supplemental hashes to identify a set of precompiled chunks and thereby narrow the search for a matching chunk.

At block 506, hash values for precompiled chunks may be obtained. Illustratively, block 506 may be carried out before or during blocks 502 and 504, allowing the routine 500 to obtain a set of hash values for precompiled chunks in advance of obtaining hash values for portions. In some embodiments, the chunk identification routine 500 may instead query a library, such as the precompiled chunk library 112 of FIG. 1, to determine whether it contains a chunk matching a particular hash value, and may perform this query for a number of portion hashes rather than obtaining a set of precompiled chunk hashes and comparing them to the hash or hashes for the source code portion.

Thereafter, at decision block 508, the hash values (or, in some embodiments, search results) are evaluated to assess whether a precompiled chunk matching the source code portion has been found. If no match is found, then at block 510 the portion and its hash values may be output. Illustratively, the filtered portion may be output to a compiler, such as the script compiler 128 of FIG. 1, for compilation into a chunk, which in turn may be stored along with the portion and the hash values in a library of precompiled chunks.

If a match is found at decision block 508, then at block 512 the precompiled chunk that matches the source code portion may be retrieved. As described above, output of the precompiled chunk may be accompanied by compiler state information that facilitates compiling and assembling precompiled and newly compiled chunks into a complete compiled script. At block 514, the precompiled chunk may be output to the compiler. In some embodiments, the chunk library may maintain a counter of how many times a particular precompiled chunk has been retrieved, and may utilize this information to prioritize its responses to queries and manage its inventory of precompiled chunks. Similarly, the chunk library may track false positives (i.e., chunks that were identified as potential matches, but did not match) and reduce the likelihood of returning these chunks in results.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
   a data store configured to store:
      a first set of computer-executable instructions,
      one or more pre-compiled chunks, wherein each of the one or more chunks comprises portions of a script compiled into computer-executable instructions, and
      one or more chunk hashes, each of the one or more chunk hashes corresponding to a respective chunk of the one or more chunks; and
   a processor in communication with the data store, the processor, when executing the first set of computer-executable instructions, configured to:
      receive, from a rendering engine of a browser application executing on a client computing device, a request to compile a first script, the first script comprising a first one or more lines of source code that are compilable into computer-executable instructions;
      divide the first script into at least a first portion and a second portion, each portion comprising a respective subset of the first one or more lines of source code;
      calculate a first portion hash based at last in part on the first portion and a second portion hash based at least in part on the second portion;
      obtain, from the data store, the one or more chunk hashes;
      determine that a first chunk hash of the one or more chunk hashes matches the first portion hash;
      determine that none of the one or more chunk hashes matches the second portion hash;
      obtain, from the data store, a first chunk corresponding to the first chunk hash;
      compile the second portion into a second chunk;
      assemble the first chunk and the second chunk into a compiled set of computer-executable instructions corresponding to the first script; and
      transmit the compiled set of computer-executable instructions to the rendering engine.

2. The system of claim 1, wherein the processor is further configured to
   store the compiled second chunk and the second chunk hash in the data store.

3. The system of claim 2, wherein the processor is further configured to:
   receive a second script, the second script comprising a second one or more lines of source code that are compilable into computer-executable instructions;
   divide the second script into at least a third portion and a fourth portion, each portion comprising a respective subset of the second one or more lines of source code;
   calculate a third portion hash based at last in part on the third portion and a fourth portion hash based at least in part on the fourth portion;
   determine that a third chunk hash of the one or more chunk hashes matches the third portion hash;
   determine that the second chunk hash matches the fourth portion hash;

obtain, from the data store, the second chunk corresponding to the second chunk hash and a third chunk corresponding to the third chunk hash;

compile the second chunk and the third chunk into a second compiled set of computer-executable instructions corresponding to the second script; and execute the second compiled set of computer-executable instructions.

4. The system of claim 1, wherein the processor configured to divide the first script into at least a first portion and a second portion is configured to apply a filter to the first script.

5. The system of claim 4, wherein the processor configured to apply the filter causes at least one of removing comments from the first script, removing whitespace from the first script, normalizing variable names in the first script, or normalizing function names in the first script.

6. A computer-implemented method under control of a computing device configured with specific computer-executable instructions, the computer-implemented method comprising:

processing a network resource request that includes compiling a first script, the first script comprising a first one or more instructions that are compilable into computer-executable instructions;

dividing the first script into at least a first portion comprising a first subset of the first one or more instructions and a second portion comprising a second subset of the first one or more instructions;

calculating a first portion hash based at least in part on the first portion and a second portion hash based at least in part on the second portion;

obtaining one or more chunk hashes, each of the one or more chunk hashes corresponding to a respective chunk stored in a data store, each respective chunk comprising computer-executable instructions;

matching a first chunk hash of the one or more chunk hashes, wherein the first chunk hash corresponds to the first portion hash;

obtaining a first chunk corresponding to the first chunk hash;

compiling the second portion into a second chunk;

assembling at least the first chunk and the second chunk into a set of computer-executable instructions corresponding to the first script; and transmitting the set of computer-executable instructions.

7. The computer-implemented method of claim 6, wherein obtaining the one or more chunk hashes comprises obtaining the one or more chunk hashes from a data store, and wherein obtaining the first chunk comprises obtaining the first chunk from the data store.

8. The computer-implemented method of claim 6 further comprising:

dividing the first script into at least a third portion comprising a third subset of the first one or more instructions and a fourth portion comprising a fourth subset of the first one or more instructions;

calculating a third portion hash based at least in part on the third portion, a fourth portion hash based at least in part on the fourth portion, and a fifth hash based at least in part on the third portion hash and the fourth portion hash;

matching a third chunk hash of the one or more chunk hashes, wherein the third chunk hash corresponds to the third portion hash;

matching a fourth chunk hash of the one or more chunk hashes, wherein the fourth chunk hash corresponds to the fourth portion hash;

matching a fifth chunk hash of the one or more chunk hashes, wherein the fifth chunk hash corresponds to the fifth hash;

obtaining, from the data store, a fifth chunk corresponding to the fifth chunk hash;

wherein assembling at least the first chunk and the second chunk into the compiled set of computer-executable instructions further includes assembling the fifth chunk.

9. The computer-implemented method of claim 6, wherein the first subset and the second subset of the first one or more instructions have at least one instruction in common.

10. The computer-implemented method of claim 6 further comprising:

calculating a first supplemental portion hash for the first portion of the first script, the first supplemental portion hash based at least in part on a subset of the first portion;

calculating a second supplemental portion hash for the second portion of the first script, the second supplemental portion hash based at least in part on a subset of the second portion;

obtaining, from the data store, one or more supplemental chunk hashes, each of the one or more supplemental chunk hashes identifying a respective subset of chunks; and identifying a first supplemental chunk hash and a second chunk supplemental hash of the one or more supplemental chunk hashes;

wherein the first supplemental chunk hash corresponds to the first supplemental portion hash, the second supplemental chunk hash corresponds to the second supplemental portion hash, and the one or more chunk hashes obtained from the data store comprise the subsets of chunks identified by the first supplemental chunk hash and the second supplemental chunk hash.

11. The computer-implemented method of claim 6, wherein the first chunk further comprises compiler state information, and wherein assembling at least the first chunk and the second chunk into a compiled set of computer-executable instructions comprises utilizing the compiler state information to assemble the first chunk and the second chunk.

12. The computer-implemented method of claim 6 further comprising applying a filter to the first script, wherein the filter excludes all or part of at least one of the one or more lines of source code.

13. The computer-implemented method of claim 12, wherein the filter excludes a script version number.

14. The computer-implemented method of claim 6 further comprising identifying a keyword in the first script, wherein dividing the first script into at least the first portion and the second portion is based at least in part on identifying the keyword.

15. The computer-implemented method of claim 6 further comprising applying a filter to the first script, wherein the filter is a regular expression parser.

16. A non-transitory computer-readable storage medium including a first set of computer-executable instructions that, when executed by a script chunking service, cause the script chunking service to:

identify a first script comprising instructions in a first format, wherein the instructions in the first format are not computer-executable;

divide the first script into at least a first portion and a second portion;

obtain, based at least in part on a first portion hash, a first chunk of computer-executable instructions corresponding to the first portion; and assemble at least the first chunk and a second chunk of computer-executable instructions corresponding to the second portion into a computer-executable script corresponding to the first script.

17. The non-transitory computer-readable storage medium of claim 16, wherein the first set of computer-executable instructions further cause the script chunking service to apply a filter to the first script, wherein the filter excludes at least a portion of the first script.

18. The non-transitory computer-readable storage medium of claim 16, wherein the first script is obtained from a rendering engine, and wherein the first set of computer-executable instructions further cause the script chunking service to transmit the computer-executable script to the rendering engine.

19. The non-transitory computer-readable storage medium of claim 16, wherein the first set of computer-executable instructions further cause the script chunking service to:

calculate a second portion hash based at least in part on the second portion;

retrieve, from a data store, one or more chunk hashes corresponding to chunks of computer-executable instructions; and determine that none of the one or more chunk hashes correspond to the second portion hash.

20. The non-transitory computer-readable storage medium of claim 19, wherein the first set of computer-executable instructions further cause the script chunking service to:

transmit, to a compiler, the second portion; and receive, from the compiler, the second chunk of computer-executable instructions.

21. The non-transitory computer-readable storage medium of claim 19, wherein the first chunk of computer-executable instructions is obtained from a storage device, and wherein the first set of computer-executable instructions further cause the script chunking service to store the second chunk of computer-executable instructions and the second portion hash on the storage device.

22. The non-transitory computer-readable storage medium of claim 16, wherein the first set of computer-executable instructions further cause the script chunking service to:

obtain compiler state information corresponding to the first chunk, the compiler state information enabling a compiler to compile at least one of a preceding or succeeding chunk; and transmit the compiler state information to the compiler.

23. The non-transitory computer-readable storage medium of claim 16, wherein the first set of computer-executable instructions further cause the script chunking service to:

calculate a first portion supplemental hash based at least in part on the first portion;

obtain a plurality of chunk hashes corresponding to the first portion supplemental hash, wherein the plurality of chunk hashes includes the first chunk hash; and determine, by comparing each of the plurality of chunk hashes to the first portion hash, that the first chunk hash corresponds to the first portion hash.

24. The non-transitory computer-readable storage medium of claim 16, wherein the first set of computer-executable instructions further cause the script chunking service to:

identify a second script comprising instructions in the first format;

divide the second script into at least a third portion and a fourth portion;

obtain, based at least in part on a third portion hash, a third chunk of computer-executable instructions corresponding to the third portion; and store the fourth portion in a pending compilation queue.

25. The non-transitory computer-readable storage medium of claim 24, wherein the first set of computer-executable instructions further cause the script chunking service to assemble at least the third chunk and a fourth chunk of computer-executable instructions corresponding to the fourth portion into a second computer-executable script corresponding to the second script.

* * * * *

UNITED STATES PATENT AND TRADEMARK OFFICE
CERTIFICATE OF CORRECTION

| | |
|---|---|
| PATENT NO. | : 9,811,321 B1 |
| APPLICATION NO. | : 14/861705 |
| DATED | : November 7, 2017 |
| INVENTOR(S) | : Jari Juhani Karppanen |

It is certified that error appears in the above-identified patent and that said Letters Patent is hereby corrected as shown below:

In the Claims

In Column 14 at Line 32, In Claim 1, change "last" to --least--.

In Column 14 at Line 61, In Claim 3, change "last" to --least--.

Signed and Sealed this
Twenty-seventh Day of March, 2018

Andrei Iancu
*Director of the United States Patent and Trademark Office*